United States Patent Office 3,404,953
Patented Oct. 8, 1968

3,404,953
MANUFACTURE OF HYDROGEN FLUORIDE
Samuel Corbett Carson, Runcorn, England, assignor to Imperial Chemical Industries Limited, Millbank, England, a corporation of Great Britain
No Drawing. Filed May 19, 1965, Ser. No. 457,202
Claims priority, application Great Britain, June 2, 1964, 22,778/64
6 Claims. (Cl. 23—153)

ABSTRACT OF THE DISCLOSURE

Process for producing hydrogen fluoride from fluorspar which includes forming a slurry of fluorspar in sulfuric acid and incorporating in the slurry a minor amount of hydrogen fluoride, fluorosulphonic acid or their mixtures based on the weight of sulfuric acid employed. The slurry is formed at a temperature not greater than 25° C. Thereafter the slurry is subjected to thermal decomposition to liberate hydrogen fluoride.

---

This invention relates to the manufacture of hydrogen fluoride.

In the manufacture of hydrogen fluoride a source of calcium fluoride such as finely divided fluorspar and sulphuric acid can be separately introduced into a static retort maintained at elevated temperature and equipped with rotatory scraping blades whereby the reactants are premixed. In such a retort partial reaction does occur to give some hydrogen fluoride and a pasty non-homogeneous mass of the reactants is formed. The latter is subsequently conveyed to another reaction vessel in which the paste is further decomposed at more elevated temperatures of the order of 200° C. to give more hydrogen fluoride. Such a process is however disadvantageous since it is not easy to control the relative proportions of sulphuric acid and fluorspar fed to the system. Again there is corrosion in the retort and reaction vessel. This is due to the imperfect mixing of the reactants which allows free sulphuric acid to attack the retort and reaction vessel at the elevated temperatures involved. Again in the pasty mass there are formed particles which contain a core of calcium fluoride but which are coated to a substantial extent with a surface layer of calcium sulphate. The latter hinders attack by sulphuric acid on the core of calcium fluoride. Also there is poor heat transfer from the external source of heat to the reaction system due to the very non-homogeneous nature of the pasty mass itself. A process which avoids premixing of the reactants by introducing the reactants separately into a reaction vessel heated to said elevated temperatures does not make easier the problem of control of the relative proportions of sulphuric acid and fluorspar fed into the system. Further, in the latter process corrosion is even more severe in that sulphuric acid (not being mixed with the fluorspar) is at least in the initial stage of the reaction freely available for attack on the reaction vessel. It is an object of the present invention to provide a process for the manufacture of hydrogen fluoride wherein these disadvantages are largely overcome.

According to the present invention we provide such a process for the manufacture of hydrogen fluoride which comprises forming a mobile slurry of fluorspar with sulphuric acid and a minor proportion with respect to sulphuric acid of hydrogen fluoride and/or fluorosulphonic acid at a temperature of not greater than 25° C. and subsequently submitting said slurry to thermal decomposition to liberate the hydrogen fluoride.

The mobile slurry is suitably formed by premixing the fluorspar with sulphuric acid and hydrogen fluoride and/or fluorosulphonic acid at greater than 5° C. and preferably at temperatures in the range 10° C. to 20° C. Thus on premixing fluorspar with sulphuric acid and hydrogen fluoride at 15° C. there is almost no evolution of hydrogen fluoride. This is most beneficial since with substantial loss of hydrogen fluoride from the mobile slurry in the premixing zone the slurry would be converted into an undesired, pasty mass. Even more important is the fact that by addition of hydrogen fluoride and/or fluorosulphonic acid to the reactants the resulting slurry or suspension can remain as such over a prolonged period, for example 3 hours or considerably more than this without thickening into a pasty mass.

Now a mobile slurry can be formed by merely admixing fluorspar and sulphuric acid at temperature of 20° C. or less so that there is little or no loss of hydrogen fluoride. The resulting slurry or suspension is quite pourable but has an increasing tendency to set with time until it eventually does so after about 1 hour. In a process for the manufacture of hydrogen fluoride this is unsatisfactory for with temporary shut down of the plant such a slurry in the premixer has a good opportunity of setting into an undesirable, pasty mass.

The fluorspar and sulphuric acid may be used in equimolar quantities but generally an excess of sulphuric acid is preferred, for example, 5% to 15% molar excess of sulphuric acid.

A slurry used according to the invention by gently stirring fluorspar with sulphuric acid (for example 10% molar excess $H_2SO_4$) and 5% by weight of hydrogen fluoride on sulphuric acid at 20° C. does not quickly set and is stirrable (that is the mass of the slurry does not go pasty) at this temperature for at least 5 hours. With greater proportions of hydrogen fluoride with respect to sulphuric acid the stability of the slurry is further increased. Thus a slurry obtained by stirring, at 20° C., fluorspar with a similar molar excess of sulphuric acid with respect to fluorspar and 10% by weight on the sulphuric acid of hydrogen fluoride is stirrable for at least 20 hours. Similar results are obtained when the sulphuric acid contains similar amounts by weight of fluorosulphonic acid.

The slurries of the present invention may be submitted to thermal decomposition at elevated temperatures, for example, in the range 120° C. to 200° C. according to the known art, to liberate the hydrogen fluoride. However said slurries according to a further novel feature of the invention may be fed continuously on to an amount of heated calcium sulphate equal to 1 to 3 moles per mole of calcium fluoride. The calcium sulphate is contained in a reaction vessel wherein it is agitated and maintained at the temperature necessary for thermal decomposition of the slurries of greater than 100° C. and preferably in the range of 120° C. to 200° C. On completion of the reaction the calcium sulphate residues are wtihdrawn and an amount thereof equivalent to 1 to 3 moles per mole of fluorspar is recycled to the reactor. This requires that that amount of calcium sulphate formed from the incoming calcium fluoride is withdrawn and rejected so that the amount of calcium sulphate in the reaction vessel remains constant.

The following example illustrates but does not limit the invention.

Example

A jacketed, stainless steel vessel of approximately 2 litres capacity was fitted with a stainless steel lid carrying a stirrer in a rubber gland, a thermometer jacket and an inlet point for introduction of feed materials. The coolant liquid in the jacket was trichloroethylene chilled with solid carbon dioxide. 1220 g. of sulphuric acid (100% $H_2SO_4$) containing 10% by weight of hydrogen fluoride were introduced into the vessel. 882 g. of finely divided fluorspar (99% $CaF_2$) were then added to the vessel and the contents were stirred at a temperature of approximately 15° C. to give a mobile slurry.

A reaction vessel was made consisting of a jacketed, trough of U-shaped cross section, constructed of mild steel, and approximately 32 cm. long by 23 cm. wide by 27.4 cm. greatest height. The vessel was fitted with a removable stainless steel lid and a horizontal, rotatable axle on which at staggered intervals were affixed 3 spiral blades so arranged as to sweep as close as possible to the walls of the lower semi-cylindrical portion of the vessel. 3000 g. of calcium sulphate of 0.12% $CaF_2$ content were placed in the reaction vessel and the blades were rotated at 36 r.p.m. Oil at a temperature of 190° C. was circulated through the jacket.

1500 g. of said slurry were pumped at a rate of 100 g. per minute for 15 minutes on to the calcium sulphate. The temperature of the contents of the cell after addition of the slurry was in the range 128° C. to 160° C. The percent fluorine of the contents of the vessel were determined at various intervals of time and from this the conversions on fluorine of the original calcium fluoride to hydrogen fluoride were determined. The "Time" is the time taken from completion of the slurry feed. The results are indicated below.

| Time, hrs. | Percent F | Percent conversions on F to HF |
|---|---|---|
| 0 | 2.7 | 62.5 |
| ¼ | 1.7 | 76.5 |
| ½ | 1.02 | 86.0 |
| 1 | 0.64 | 91.0 |

Since provision was not made for recycle of calcium sulphate the conversion figures are for a single pass. The overall efficiency would have been higher with recycle of calcium sulphate.

What we claim is:

1. A process for the manufacture of hydrogen fluoride which comprises forming a mobile slurry of fluorspar by adding to said fluorspar sulfuric acid and a member selected from the group consisting of hydrogen fluoride and a mixture of hydrogen fluoride with fluorosulphonic acid at a temperature up to about 20° C., said member being present in amounts of about 5 to about 10% by weight of said sulfuric acid and thermally decomposing said slurry to liberate hydrogen fluoride.

2. The process of claim 1 wherein there is employed an excess of sulfuric acid with respect to fluorspar.

3. The process of claim 2 wherein there is employed 5 to 15% molar excess of sulfuric acid with respect to fluorspar.

4. The process of claim 1 wherein said slurry is formed by premixing said fluorspar with said sulfuric acid and said member at a temperature ranging between 10° C. to 20° C.

5. The process of claim 1 wherein said slurry is fed continuously onto an amount of calcium sulfate heated at 120° C. to 200° C., equivalent to 1 to 3 moles per mole of fluorspar, contained in a reactor maintained at a temperature greater than 100° C., withdrawing the calcium sulfate residue and recycling an amount equivalent to 1 to 3 moles per mole of fluorspar to the reactor and recovering evolved hydrogen fluoride.

6. The process of claim 5 wherein said reactor is maintained at a temperature of 120° C. to 200° C.

References Cited

UNITED STATES PATENTS

| 3,300,279 | 1/1967 | Parisot | 23—153 |
| 1,150,415 | 8/1915 | Bishop | 23—153 |
| 1,316,569 | 9/1919 | Fickes | 23—153 |
| 2,456,509 | 12/1948 | Hopkins | 23—153 |
| 2,932,557 | 4/1960 | List et al. | 23—153 |
| 3,071,437 | 1/1963 | Quarles | 23—153 |

OSCAR R. VERTIZ, *Primary Examiner.*

EDWARD STERN, *Assistant Examiner.*